United States Patent [19]

Rich

[11] Patent Number: 4,707,014

[45] Date of Patent: Nov. 17, 1987

[54] AUTOMOTIVE ROOF SPOILER HAVING RETRACTABLE, CONCEALABLE LAMPS

[75] Inventor: Lawrence D. Rich, New Baltimore, Mich.

[73] Assignee: Riverside International, Inc., Troy, Mich.

[21] Appl. No.: 930,833

[22] Filed: Nov. 14, 1986

[51] Int. Cl.$^4$ .......................... B62D 35/00; B60Q 1/00
[52] U.S. Cl. ..................................... 296/1 S; 296/91; 362/65; 362/66; 362/74; D12/181
[58] Field of Search .................... 296/1 S, 91; 362/65, 362/66, 74; 340/84, 87; D12/181

[56] References Cited

U.S. PATENT DOCUMENTS 4,159,843 7/1979 Crossman ............................ 296/1 S

FOREIGN PATENT DOCUMENTS 1215688 12/1970 United Kingdom ................ 296/1 S
2136362 9/1984 United Kingdom ................ 296/1 S Primary Examiner—Robert B. Reeves
Assistant Examiner—Dennis H. Pedder
Attorney, Agent, or Firm—Cullen, Sloman, Cantor, Grauer, Scott & Rutherford

[57] ABSTRACT

An automotive roof spoiler having retractable, concealable lamps particularly suitable for trucks and other vehicles used for both on-road and off-road purposes. The automotive roof spoiler includes lamps which are mounted within the roof spoiler about axes which are generally parallel to the longitudinal axis of the spoiler and a motor, preferably located within the roof spoiler, which rotates the lamps from a first position wherein the back surfaces of the lamps are generally parallel with the top upwardly inclined surface of the roof spoiler for on-road use to a second position wherein the front surfaces of the lamps are generally vertical and extend above the spoiler top surface for off-road use. The preferred embodiment includes covers which are hingedly attached to the spoiler adjacent the back surface and which cover the lamp openings in the top wall of the spoiler in coplanar relation when the lamps are rotated to the downward closed position for on-road use.

18 Claims, 12 Drawing Figures

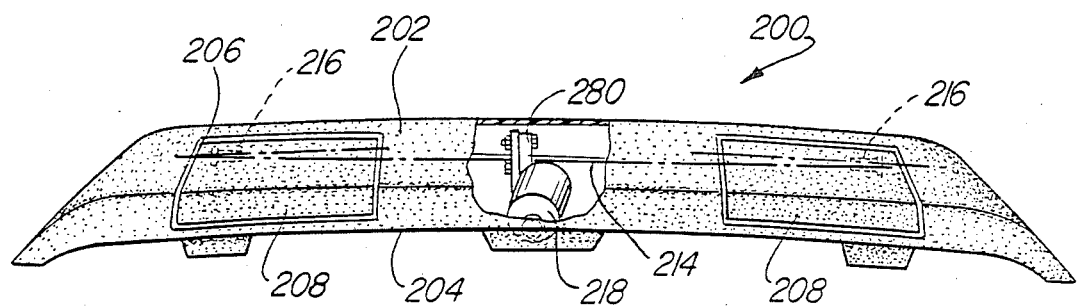
Fig-8
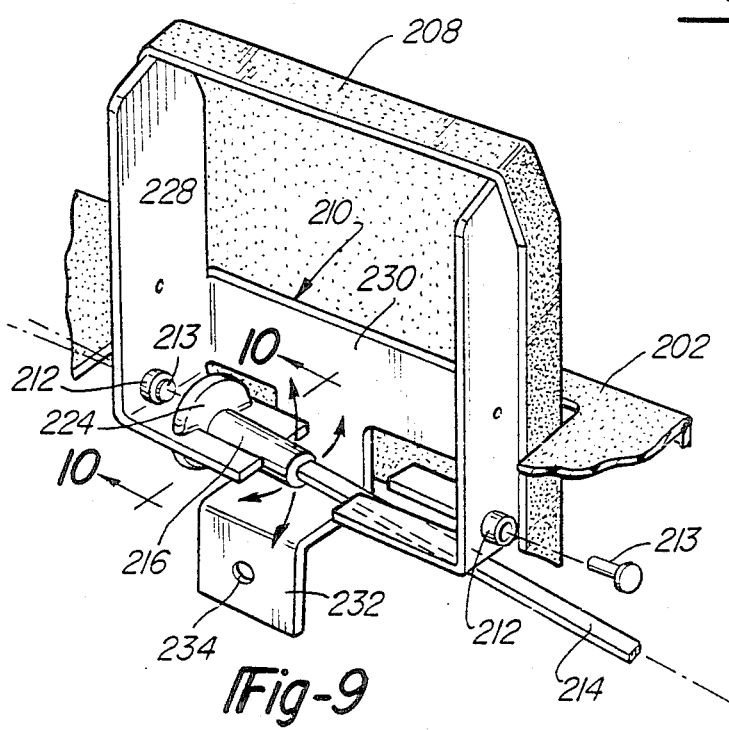
Fig-9
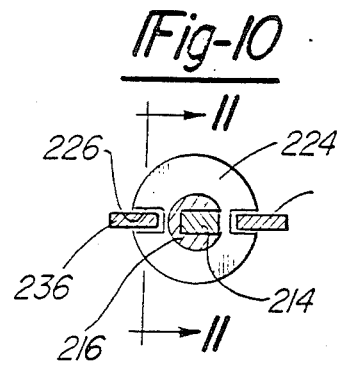
Fig-10
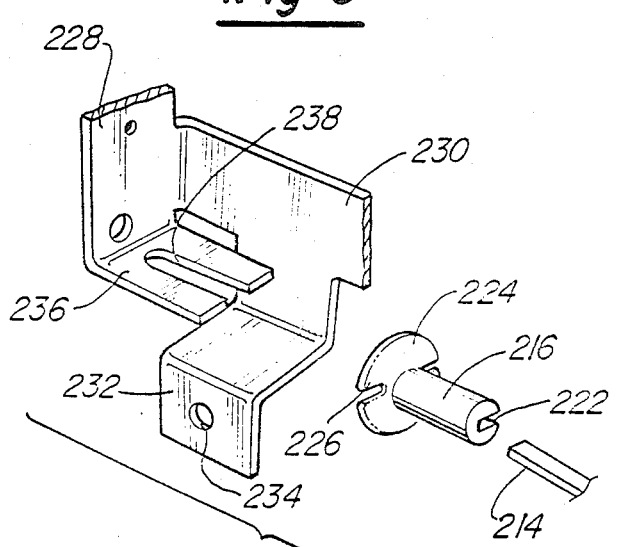
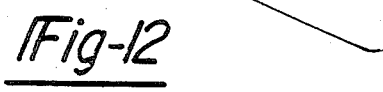
Fig-12

AUTOMOTIVE ROOF SPOILER HAVING RETRACTABLE, CONCEALABLE LAMPS

BACKGROUND OF THE INVENTION

Automotive roof spoilers have been available for many years. The roof spoiler is mounted on the roof of an automobile or the cab of a truck to reduce "drag" due to air friction as the car or truck moves forwardly by creating a laminar airflow over the top of the vehicle. The roof spoiler may also create "lift", similar to the wing of airplane. It is also used on the back "trunk section" of a race car to increase traction and reduce fuel consumption. A roof spoiler also reduces accumulation of road dirt or dust on the back window of the vehicle, which is particularly useful in off-road use where the vehicle travels over trails or dirt and gravel roads.

A roof spoiler preferably has an aerodynamic shape, wherein the cross-section of the roof spoiler is similar to the cross-section of an airplane wing, and the forward or leading edge is generally V-shaped, including an upwardly inclined top surface and a generally horizontal bottom surface. The midportion of the airfoil is generally spaced above the roof or cab surface of the vehicle to direct the air passing over the top of the vehicle, generally parallel to the roof or cab surface, and to create the desired lift.

Roof-mountable lamps are also available as an aftermarket item for off-road use. Many states, however, prohibit the use of roof-mounted lamps for on-road use, and several states require that the lamps be covered when the vehicle is used on the highway. The lamps are generally mounted to the roof in a vertical position, increasing the frictional air drag of the vehicle. Where the vehicle is used for both on-road and off-road use, the lamps must be repeatedly covered and uncovered manually, which often results in illegal or improper use, or the lamps may be accidentally uncovered during on-road. Further, the lamps may be damaged or broken by stones which are thrown up at high speed during on-road use. It should be understood that roof-mounted lamps are particularly important in off-road use on trails and small dirt and gravel roads wherein the use of such lamps is permitted because of the need for intense illumination for safety purposes.

There is, therefore, a substantial need for concealable or retractable lamps, wherein the lamps may be rotated to an upright or vertical position for off-road use and to a generally horizontal position, wherein the lamps are not functional, to reduce drag and wherein the lamps are protected from stones and other debris during on-road use. The automotive roof spoiler of this invention combines the advantages of a spoiler with retractable, concealable lamps, wherein the lamps may be rotated to an upright vertical position for off-road use or to a downward position and concealed within the spoiler.

SUMMARY OF THE INVENTION

The automotive roof spoiler of this invention includes at least one retractable, concealable lamp, however, the preferred embodiment includes at least two spaced lamps to fully illuminate the area in front of the vehicle for off-road use. The spoiler preferably includes free side end portions and a midportion, wherein the side portions curve upwardly into the midportion and the midportion is spaced above the vehicle. The forward leading edge portion of the roof spoiler has a generally V-shaped configuration, with the top surface or wall inclined generally upwardly from the leading edge portion, and the bottom surface or wall extending generally horizontally to define an airfoil, reducing frictional air drag. As will be understood, the roof spoiler is mounted on the vehicle generally transverse to the axis of the vehicle and the preferred embodiment of the roof spoiler includes a back surface or wall, defining an enclosed airfoil similar to the cross-section of the wing of an airplane.

The roof spoiler includes at least one opening through the midportion top surface or wall and a lamp is mounted within the opening on a rotational axis adjacent the rear surface or wall. A power means, such as an electric motor, which is preferably mounted within the spoiler, is operably connected to the lamp to rotate the lamp from a first position, wherein the back surface of the lamp is generally flush or parallel to the top surface of the spoiler for on-road use, and to a second position wherein the front surface of the lamp is generally upright or vertical, extending above the spoiler surface, for off-road use. In the preferred embodiment of the automotive roof spoiler of this invention, the lamp opening in the top surface includes a cover which is hingedly attached to the spoiler midportion and which covers the opening when the lamp is in the first closed position. The cover is rotatable with the lamp about the hinge axis to cover and support the lamp back surface when the lamp is in the second upright position. As described, however, the preferred embodiment of the roof spoiler of this invention includes at least two lamps, wherein the top surface or wall of the spoiler includes two spaced openings and lamps, and the motor is preferably located within the spoiler, between the lamps, to rotate the lamps in unison.

In the most preferred embodiment of the roof spoiler of this invention, the longitudinal axis of the spoiler midportion is curved upwardly to conform generally to the shape of the vehicle roof, and the rotational axes of the lamps are therefore angularly related to the longitudinal axis of the spoiler. In this embodiment, the lamps are operably connected to the power means or motor by a flexible shaft, and the cover includes a bracket assembly which receives, retains and supports the lamp, particularly in the upright position. Further, the spoiler preferably includes a spring-biased lower cover plate which is received against the front lower surface of the lamp when the lamp is in the upright position, which improves the appearance and limits entry of foreign matter in the spoiler.

The automotive roof spoiler of this invention therefore provides all of the advantages of a conventional roof spoiler, including reduction of the frictional air drag and lift, and the roof spoiler reduces the accumulation of dirt and dust on the vehicle back window. Further, the automotive roof spoiler of this invention includes retractable, concealable lamps wherein the lamps may be rotated to a generally horizontal position and concealed within the roof spoiler for on-road use, wherein the lamps are preferably inoperative, protected and do not interfere with the advantages of the roof spoiler. Further, as described, the lamps may be rotated to a generally upright or vertical position for off-road use, wherein the lamps are firmly supported by the cover and bracket assembly. Further, the lamps may be operated from within the cab or passenger compartment, eliminating the requirement for manually removing a cover for the lamps.

Other advantages and meritorious features of the automotive roof spoiler of this invention will become apparent from the following description of the preferred embodiments, the appended claims and the drawings, a brief description of which follows.

BRIEF DESCRIPTION OF THE DRAWINGS

FIG. 8 is a front view of an alternative embodiment of the roof spoiler of this invention;

FIG. 9 is an enlarged perspective view of the cover and bracket assembly of the roof spoiler shown in FIG. 8;

FIG. 10 is a partial cross-sectional view of the flexible shaft and connector assembly shown in FIG. 9, in the direction of view arrows 10—10;

FIG. 11 is a side cross-sectional view of FIG. 10, in the direction of view arrows 11—11; and FIG. 12 is an exploded, partially cross-sectioned perspective view of the bracket and drive assembly shown in FIGS. 9-11.

DETAILED DESCRIPTION OF THE PREFERRED EMBODIMENTS OF THE INVENTION

Figure 1:
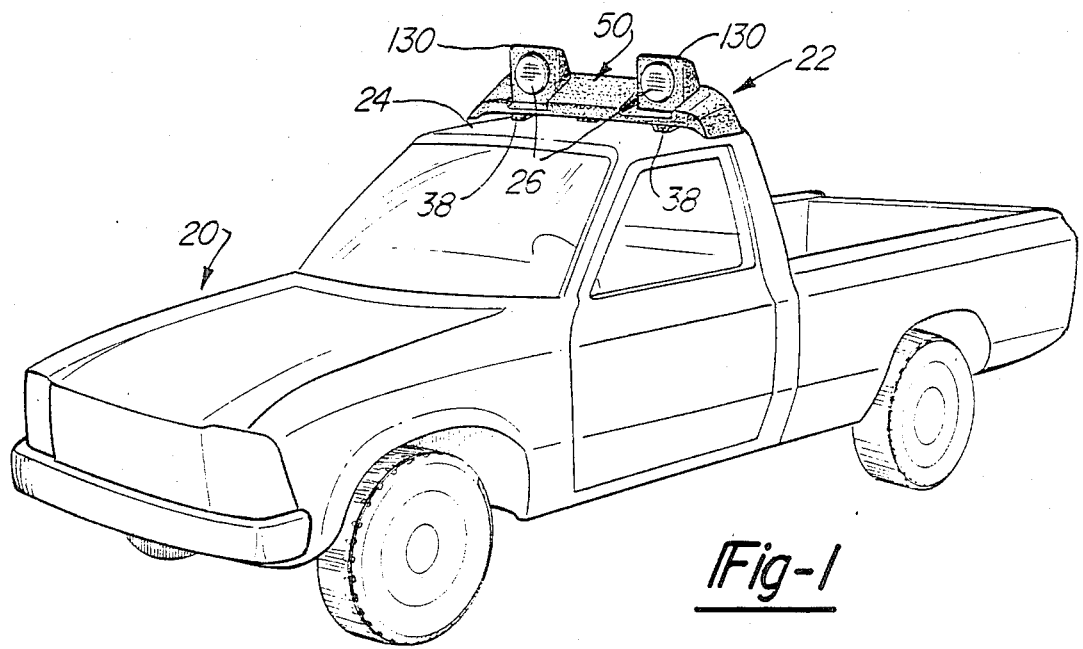
FIG. 1 is a side elevation of a conventional truck having the automotive roof spoiler of this invention.

FIG. 1 illustrates a conventional vehicle, such as a pick-up truck, having one embodiment of the roof spoiler 22 of this invention attached to the roof 24 of the cab. As described, the roof spoiler of this invention includes retractable, concealable lamps or lights 26. In FIG. 1, the lamps are in the upright, generally vertical position for off-road use.

Figure 2:
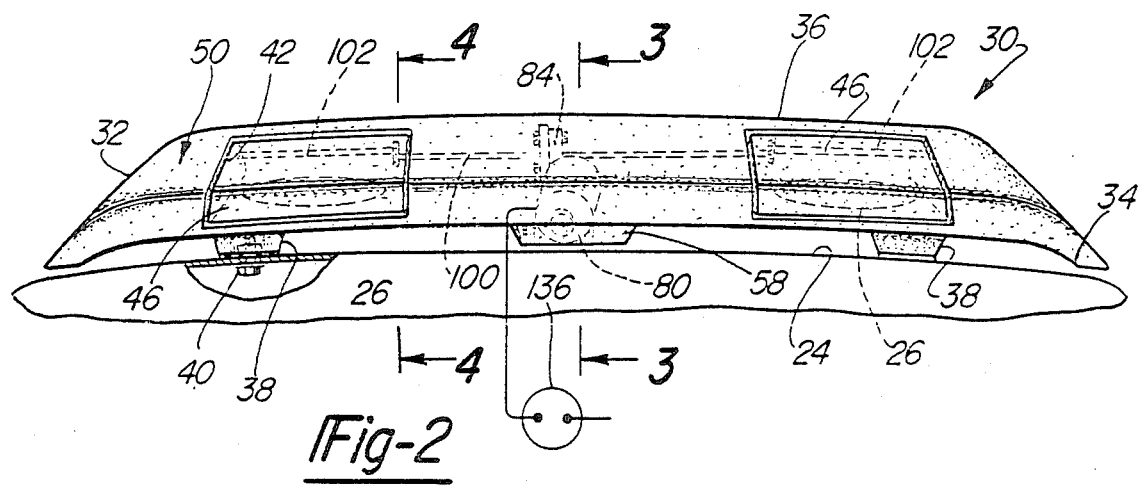
FIG. 2 is a front view of one embodiment of the roof spoiler of this invention mounted to a vehicle roof.
Figure 3:
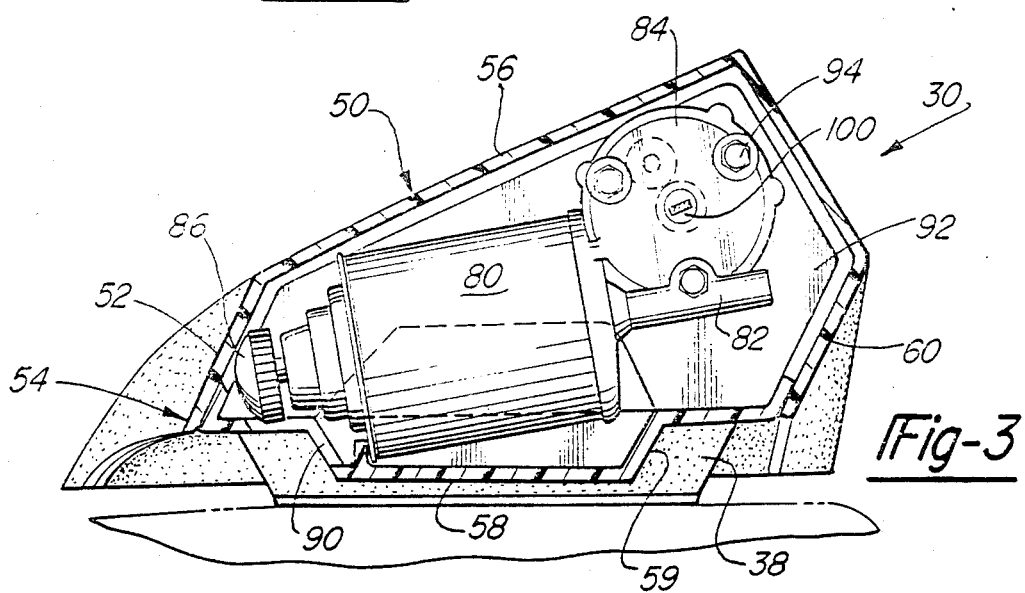
FIG. 3 is a partially cross-sectioned view of the embodiment of the roof spoiler shown in FIG. 2 in the direction of view arrows 3—3.
Figure 4:
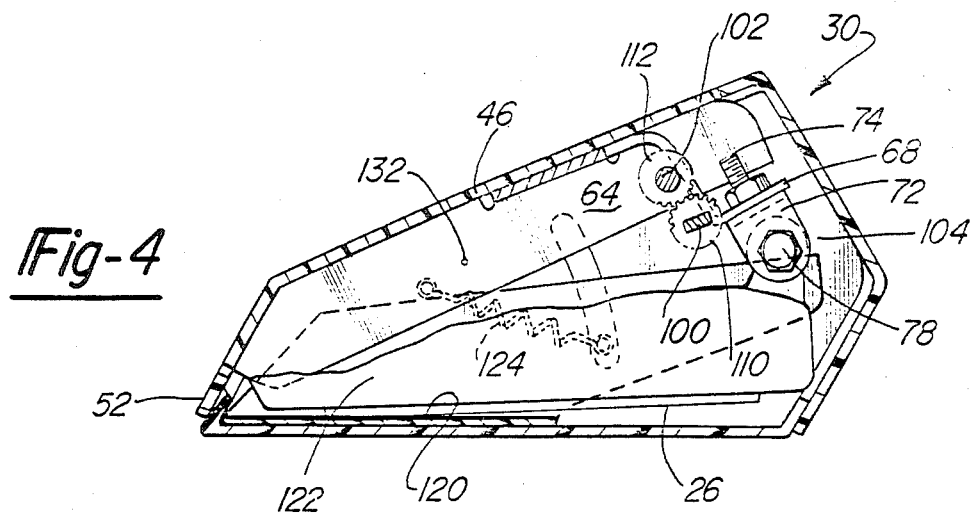
FIG. 4 is a cross-sectional view of the embodiment of the roof spoiler shown in FIG. 2, in the direction of view arrows 4—4 with the lamps concealed within the roof spoiler.
Figure 5:
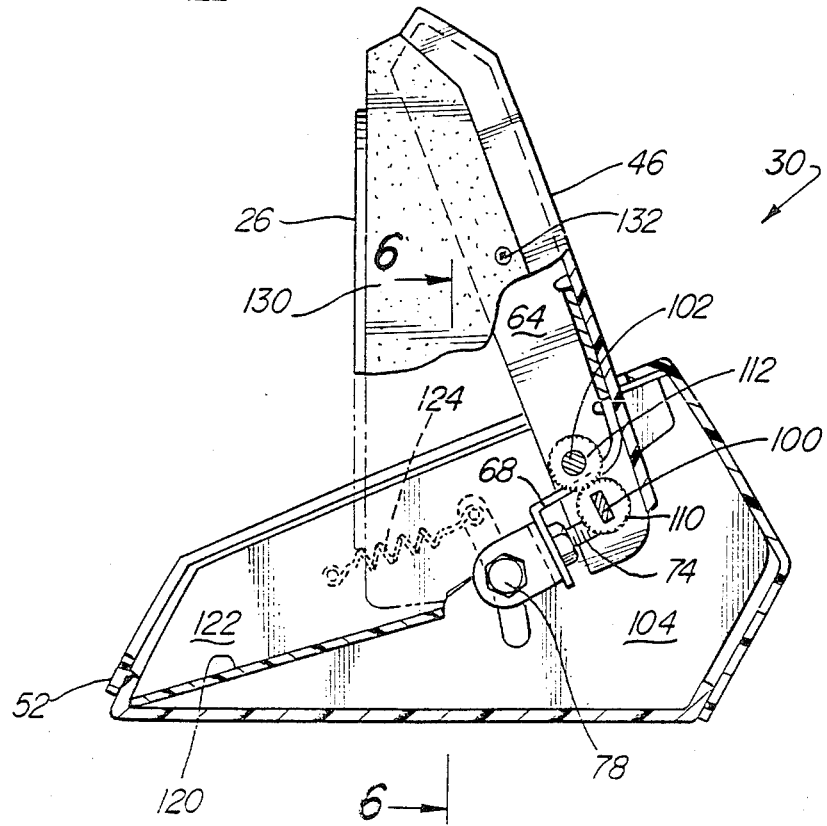
FIG. 5 is a cross-sectional view of the embodiment of the roof spoiler shown in FIG. 2, similar to FIG. 4, with the lamps rotated to a generally upright or vertical position.
Figures 6, 7:
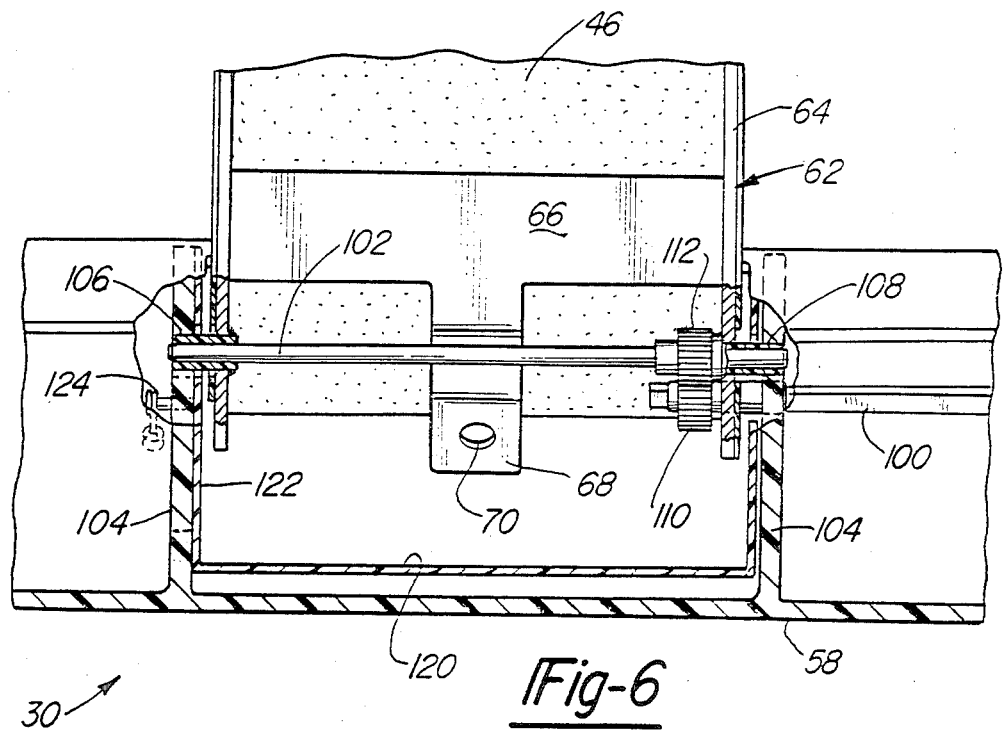
FIG. 6 is a front cross-sectional view of the embodiment of the roof spoiler shown in FIG. 5, in the direction of view arrows 6—6.
FIG. 7 is a partially exploded perspective top view of a portion of the roof spoiler shown in FIGS. 2-6, illustrating the lamp bracket assembly and cover.

FIGS. 2-7 illustrate the construction and operation of one embodiment of the automotive roof spoiler 30 of this invention having retractable, concealable lamps. As shown particularly in FIG. 2, the roof spoiler includes side portions 32 having free end portions 34 and a midportion 36. As shown, the side portions 32 are curved upwardly into the midportion 36 and the midportion is slightly bowed or arcuate to conform generally to the curvature of the roof 24. The roof spoiler includes brackets 38, which may be integral with the spoiler, and which are attached to the roof by nuts and bolts 40. As best shown in FIGS. 2 and 6, the top wall 50 includes rectangular openings 42 which receive the lamps 44 as best shown in FIGS. 5 and 7. When the lamps are in the lower concealed position, the openings 42 are closed by covers 46.

FIGS. 3 and 4 best illustrate the aerodynamic shape of the roof spoiler 30. As best shown in FIG. 3, the roof spoiler includes a top wall 50, which is generally L-shaped in cross-section, including a first leg portion 52 at the leading edge 54 and a second leg portion 56. Both leg portions 52 and 56 are inclined upwardly from the leading edge 54, which is generally V-shaped. The bottom wall 58 is generally horizontal or parallel to the top surface of the roof, as best shown in FIGS. 4 and 5. The back or trailing wall 60 of the roof spoiler is also generally V-shaped to improve the aerodynamics of the spoiler. As will be understood from a comparison of FIGS. 3-6, the roof spoiler 30 comprises two principal parts or components. The top and rearward walls 50 and 60 may be integrally cast as one part, and the bottom wall 58 is a separate part, which may be nested within the upper portion, as best shown in FIGS. 3 and 4. The bottom wall includes a channel-shaped well 59 which receives the motor 80, and the bottom wall includes several integral sidewalls as described hereinbelow. The bottom wall 58 may be attached to the top and rearward walls 50 and 60 by any suitable means, including adhesive bonding, etc.

The lamps 44 are attached to the roof spoiler and supported by generally H-shaped brackets 62, as best shown in FIG. 7. The brackets 62 each include opposed side portions 64, a cross-back portion 66, which is perpendicular to the side portions, and an integral L-shaped tab 68 having a hole 70 at its free end. The lamp 44 is attached to the bracket by a clevis 72, which includes an integral bolt 74, which is received through the opening 70 and attached by a nut 76. The clevis 72 is attached to the base of the lamp 44 by a bolt and nut 78. The lamps and clevis assembly 78 may be purchased from several sources, including Robert Bosch Corporation. A particularly suitable lamp is a halogen lamp which provides substantial illumination in a relatively small package.

In the disclosed embodiment of the automotive roof spoiler 30, the lamps 44 are rotated by an electric motor 80 best shown in FIG. 3. The motor drive shaft or spindle is enclosed within the housing portion 82, which rotates a gear located within the speed reducer 84. The disclosed embodiment of the motor includes a manual adjustment knob 86 which may be reached through the opening 90 in the bottom wall. As will be understood, the motor 80, including the speed reducer 84, may be purchased from several sources, including the General Electric Company. In the disclosed embodiment, the speed reducer 84 is bolted to a sidewall 92, which may be integral with the bottom wall 58, by three bolts 94.

As best shown in FIG. 2, the motor and speed reducer, 80 and 84, are operably connected to the bracket assembly 62 and lamps 44 by a shaft 100. As best shown in FIGS. 6 and 7, the bracket assemblies 62 are rotatably mounted on shafts 102 between sidewalls 104, which are integral with the bottom wall 58 in the described embodiment. The shafts 102 are rotatably supported in the sidewalls 104 by bearings 106 and 108. It will now be understood that the rotational axes 102 of the lamps and bracket assemblies, 44 and 62, are slightly angularly related to the curved longitudinal axis of the spoiler and, therefore, the drive shaft 100, which is rectangular in cross-section, must be flexible to accommodate the misalignment in the disclosed embodiment of the roof spoiler. The shaft 100 is operably connected to the gear assembly in the speed reducer 44, such that the shaft is rotated by the motor 80 and speed reducer 84. In the disclosed embodiment, the ends of the shaft 100 each include a gear 110, which mates with the gear 112 on the shaft 102, such that the lamps and bracket assemblies rotate upon rotation of the shaft 100, which is rotated by motor 80, as described above.

In the disclosed embodiment, the roof spoiler assembly includes channel-shaped, spring-biased lower cover plates 120 which pivot about their forward ends in the U-shaped channel formed in the lower wall, as shown in FIGS. 4 and 5. A spring 124 is connected between the sidewall 104 of the bottom wall 58 and the sidewall 122 of the lower cover plate. The spring 124 is a small coil spring which biases the lower cover plate upwardly about the forward pivot axis, as shown in FIG. 5, to engage the lower forward end of the lamp 44, improving the appearance of the assembly in the upright lamp position and preventing entry of foreign matter. When the lamp is rotated to the closed portion, as shown in FIG. 4, the lamp biases the lower cover plate downwardly, out of the way. As shown in FIG. 7, the front of the lamp is surrounded by an enclosure panel 130, which is attached to the bracket assembly 62 by pins 132. The cover 130 is also shown in FIG. 1.

Having described the structural details of the roof spoiler and lamp assembly shown in FIGS. 2-7, it is now possible to describe the operation of the assembly. As shown in FIG. 2, the electric motor 80 may be electrically connected to a switch 136 located within the cab of the vehicle. The motor 80 is then energized by closing the switch 136, which rotates the shaft 100 to "open" or "close" the lamps 44. When the shaft 100 is rotated in a counterclockwise direction, the lamp and bracket assemblies, 44 and 62, are rotated in a clockwise direction to raise the lamps to a generally upright or vertical position as shown in FIG. 5. When the shaft 100 is rotated in the opposite direction, the lamp and bracket assembly is rotated in a counterclockwise direction to the "closed" position shown in FIG. 4. As the lamps are rotated in a counterclockwise direction, as shown by the arrow 140 in FIG. 4, the front face of the lamp engages the lower cover plate 120, rotating the lower cover plate against the resistance of spring 124. As described above, the lamps may thus be rotated to the position shown in FIG. 2, wherein the lamps are wholly located and concealed within the midportion 36 of the spoiler, wherein the covers 46 are flush with the top wall 50 of the roof spoiler, defining an aerodynamic shape which reduces frictional air drag for on-road use. Upon energizing the motor, the lamps may be rotated to an upright vertical position, as shown in FIG. 1, for off-road use. As will be understood, the lamps may be automatically turned on as they are rotated to the upright position, as shown in FIG. 1, and turned off as the lamps are rotated to the position shown in FIG. 2.

FIGS. 8-12 illustrate certain details of an alternative embodiment of the automotive roof spoiler having retractable, concealable lamps of this invention. The modifications relate primarily to the means for rotating the lamps and bracket assemblies. As described above, automotive spoiler 200 includes a top wall 202 and bottom wall 204, which are nested and define an enclosure which receives the concealable lamps, not shown. The top wall 202 includes rectangular openings 206, and the covers 208 and bracket assemblies 210 are rotatably supported on bearings 212 received in openings in the sidewalls (not shown) integral with the bottom wall 204. In the embodiment shown in FIGS. 8-12, however, the support shafts for the lamp and bracket assembly 210 have been eliminated and replaced with opposed pins 213. In the disclosed embodiment, the flexible drive shaft 214 is directly connected to the bracket assemblies 210 by couplings 216, as described below. As described above, the flexible drive shaft 214 is connected to the speed reducer 220 and motor 218 for rotation of the flexible drive shaft 214.

The coupling 218 includes a longitudinal slot 222 which receives the flexible drive shaft 214 and a disc-shaped portion 224 having radial slots 226. The flexible drive shaft 214 may be connected by any suitable means in the slot 222 in the coupling 216, including pins or adhesive bonding. The embodiment of the bracket assembly 210 disclosed in FIGS. 9 and 12 includes side portions 228, a transverse portion 230, a central tab portion 232, having a hole 234 at its free end for attaching the lamp, as described above, and ear portions 236 which extend inwardly from the lower ends of the side portions 228. The ear portions each include a transverse slot 238, as best shown in FIG. 12. The slot 238 of the outboard ear 236 of each of the bracket assemblies receives the cylindrical body portion of the coupling 216. The slots 226 in the disc-shaped portion 224 of the coupling receive the ear portions adjacent the slot 238, as best shown in FIG. 9. Rotation of the flexible shaft 214 will thus result in rotation of the bracket assemblies 210, including the covers 208 and the lamps, not shown. The slots 238 in the inboard ears 236 receive the flexible shaft 214 during rotation of the shaft. FIG. 10 illustrates the drive connection between the shaft 214, the coupling 216 and the ear 236 of each bracket assembly. FIG. 11 illustrates the flexibility of the coupling to accommodate angular torsional loads, such that the flexible shaft 214 will rotate the bracket assemblies 210, although the rotational axes of the bracket assemblies about bearings 212 are not aligned with the rotational axis of the drive shaft 214. As shown in FIG. 11, the end side surfaces of the slots 226 are arcuate to allow the couplings 216 to rock on the longitudinal axis of the ears 236 to accommodate the misalignment of the rotational axes and manufacturing tolerances.

The operation of the lamps in the bracket assemblies 210 of the embodiment of the spoiler shown in FIGS. 8-12 is substantially the same as described above in regard to FIGS. 2-7. As described, actuation of the motor 218 will rotate the flexible shaft 214, rotating the bracket assemblies 210, including the covers 208 and the lamps, not shown. Thus, the lamps may be rotated to a closed or downward position, as shown in FIG. 8, wherein the covers 208 are flush with the top surface 202 of the spoiler. Alternatively, the lamps may be rotated to a generally upright or vertical position, as shown in FIG. 9, wherein the bracket assemblies 210 securely support the lamps for off-road use.

As will be understood, various modifications may be made to the automotive roof spoiler with retractable, concealable lamps of this invention without departing from the purview of the appended claims. For example, the top covers 46, 208 may be eliminated, wherein the back surface of the lamp would preferably be flush with the top surface of the spoiler, however, top covers are preferred to provide improved aerodynamics for the spoiler and to reduce the entry of foreign matter into the spoiler. The lower cover plates 120 may also be eliminated. The principal components of the spoiler, including the top and bottom walls, may be formed of any suitable material, including vacuum-formed acrylonitrile butadiene-styrene (ABS), other plastic materials and metal. As described above, the motor is a purchased item, available from several sources, and the lamps are preferably high illumination lamps, such as halogen lamps, available from the Robert Bosch Corporation. The bracket assemblies, flexible drive shaft 214, etc. are preferably formed from metal, such as steel.

As described above, the roof spoiler of this invention provides several important advantages over prior art roof-mounted lamps and combines the advantages of a roof spoiler with roof-mounted lamps, wherein the lamps may be concealed within the roof spoiler for on-road use or rotated to an upright position for off-road use.

I claim:

1. An automotive roof spoiler having at least one retractable, concealable lamp, said roof spoiler including free side end portions and a midportion therebetween, said side end portions curving upwardly into said midportion, a forward leading edge portion of said roof spoiler having a generally V-shaped configuration with a top surface inclined generally upwardly from said leading edge portion and a bottom surface of said midportion generally horizontal to define an airfoil shape reducing air frictional drag, attachment means for attaching said automotive roof spoiler to a roof of a vehicle generally transverse to a longitudinal axis of said vehicle with said midportion bottom surface spaced above said roof, at least one opening through said midportion top surface and said spoiler midportion having at least one said lamp located therein within said opening, said lamp rotatably mounted on an axis generally parallel to a longitudinal axis of said spoiler midportion, and power means attached to said lamp adapted to rotate said lamp about said axis from a first position wherein a front surface of the lamp is generally horizontal for on-road use to a second position wherein the front surface of said lamp is generally vertical and extends above said spoiler top surface for off-road use.

2. The automotive roof spoiler define in claim 1, characterized in that said spoiler midportion top surface includes a cover hingedly attached to said midportion covering said opening when said lamp is in said first position and said cover is rotatable about said axis to cover a back surface of said lamp when said lamp is in said second generally vertical position.

3. The automotive roof spoiler defined in claim 1, characterized in that said spoiler midportion includes two spaced openings and lamps, each of said lamps mounted on a bracket which is rotatably mounted within said spoiler, said power means including a motor located within said spoiler midportion, operably connected to said brackets, for rotating said lamps.

4. The automotive roof spoiler defined in claim 3, characterized in that said spoiler includes a switch means connected to said motor and located within said vehicle and operable to rotate said lamps from said first position to said second position for off-road use.

5. The automotive roof spoiler defined in claim 1, characterized in that said spoiler includes a spring-biased bottom cover plate pivotally supported adjacent said leading edge within said spoiler midportion beneath said lamp, a spring means normally biasing a rearward end of said cover plate against a lower end of said lamp in said second vertical position.

6. An automotive roof spoiler having at least one retractable, concealable lamp, said roof spoiler including side end portions and a midportion therebetween, said side end portions curving upwardly into said midportion and said midportion having forward and trailing surfaces, said forward surface having a generally V-shaped leading edge with a top surface inclined generally upwardly from said leading edge and a bottom surface generally horizontal to define an airfoil shape reducing frictional air drag, attachment means for attaching said automotive roof spoiler to a roof of a vehicle generally transverse to a longitudinal axis of said vehicle with said midportion bottom surface spaced above said roof, at least one opening through said midportion top surface and at least one lamp located in said spoiler midportion within said opening, said lamp rotatably mounted on an axis generally parallel to a longitudinal axis of said spoiler midportion, power means operably attached to said lamp adapted to rotate said lamp about said axis from a first position wherein a front surface of said lamp is generally horizontal for on-road use and a second position wherein the front surface of said lamp is generally vertical and extends above said spoiler top surface for off-road use, and a cover hingedly attached to said midportion adjacent said trailing surface covering said opening when said lamp is in said first position and generally coplanar with said midportion top surface defining an aerodynamic surface in said first lamp position with said top surface and said cover being rotatable about said hinge axis to a generally vertical position to cover a back surface of said lamp when said lamp is in said second position.

7. The automotive roof spoiler defined in claim 6, characterized in that said spoiler midportion includes two spaced openings and a retractable, concealable lamp located within each of said openings, each of said lamps rotatably supported within said spoiler on a bracket, said power means including a motor located within said spoiler midportion between said lamps and operably connected to said brackets for rotating said lamps about each of said axes.

8. The automotive roof spoiler defined in claim 7, characterized in that said spoiler midportion is arcuate to generally conform to the roof of said vehicle and said brackets are each mounted about an axis angularly related to the curved longitudinal axis of said spoiler, said shaft means being flexible and extending from said power means to said brackets to rotate said lamps about said axes.

9. The automotive roof spoiler defined in claim 6, characterized in that said spoiler includes a spring-biased bottom cover plate pivotally supported adjacent said leading edge within said spoiler midportion beneath said lamp, a spring means normally biasing the rearward end of said lower cover plate against the lower end of said lamp in said second vertical position.

10. The automotive roof spoiler as defined in claim 6, characterized in that said spoiler includes a switch means located within said vehicle connected to said power means, said switch means operable to energize said power means to rotate said lamp about said axis.

11. An automotive roof spoiler having retractable, concealable lamps, said roof spoiler defining an enclosure having a generally V-shaped leading edge portion including a top wall inclined generally upwardly from said leading edge portion and a bottom wall which extends generally horizontally, said leading edge defining an airfoil reducing frictional air drag, and a rearward wall enclosing said roof spoiler, attachment means for attaching said roof spoiler to a roof of a vehicle generally transverse to a longitudinal axis of said vehicle with said bottom wall spaced above said automotive roof, at least two spaced openings in said top wall each having a lamp located within said spoiler, said lamps each rotatably mounted on an axis generally parallel to the longitudinal axis of said spoiler, power means operably attached to said lamps adapted to rotate said lamps about said axes from a first position wherein a front surface of the lamp is generally horizontal for on-road use to a second position wherein the front surface of said lamps are generally vertical and extend above said spoiler top surface for off-road use, and said spoiler including covers hingedly attached to said spoiler adjacent said rear wall and covering said openings when said lamps are in said first position, said covers being rotatable about said hinge axes to cover a back surface of said lamp when said lamps are in said second position.

12. The automotive roof spoiler defined in claim 11, characterized in that said covers each include a bracket means which receives and supports each of said lamps for rotation about said axes and said bracket means supports said lamps in said second vertical position.

13. The automotive roof spoiler defined in claim 11, characterized in that said spoiler includes spring-biased bottom cover plates within said openings and beneath said lamps, said cover plates each pivotally supported at its forward end, and a spring means biasing said cover plate against a lower end of said lamps when said lamps are in the second generally vertical position.

14. The automotive roof spoiler defined in claim 11, characterized in that said power means includes a motor located between said lamps and operably connected to said lamps by a shaft means.

15. The automotive roof spoiler defined in claim 14, characterized in that said spoiler is bowed downwardly about its longitudinal axis and said lamp rotation axes are angularly related to said bowed spoiler longitudinal axis and said motor is operably connected to said lamps by a flexible shaft, said flexible shaft rotating said lamps in unison.

16. The automotive roof spoiler defined in claim 15, characterized in that said spoiler includes a switch means connected to said motor located within said vehicle and said switch means operable to rotate said lamps about said axes.

17. The automotive roof spoiler defined in claim 15, characterized in that said covers each include a bracket means which receives, supports and retains said lamps and said shaft means are operably connected to said bracket means to rotate said lamps.

18. The automotive roof spoiler defined in claim 11, characterized in that said top wall is generally angularly shaped, including a first upwardly extending leg portion extending from said leading edge and a longer upwardly extending leg portion which extends to said back wall and said covers each having substantially the same angularly-shaped configuration to define coplanar surfaces when said covers are in the first position.

* * * * *